United States Patent [19]

Peters et al.

[11] 4,151,150
[45] Apr. 24, 1979

[54] STYRENE-BUTADIENE INTERPOLYMER LATEX BASED CEMENT ADDITIVES CONTAINING A SILANE

[75] Inventors: James Peters; Victor E. Meyer, both of Midland, Mich.

[73] Assignee: The Dow Chemical Company, Midland, Mich.

[21] Appl. No.: 865,068

[22] Filed: Dec. 27, 1977

[51] Int. Cl.$^2$ ............................................. C08L 9/08
[52] U.S. Cl. ........................... 260/29.7 R; 260/29.7 S
[58] Field of Search ....................... 260/29.7 S, 29.7 R

[56] References Cited

U.S. PATENT DOCUMENTS

| Re. 28,722 | 2/1976 | Sanders | 260/29.7 S |
|---|---|---|---|
| 2,813,085 | 11/1957 | MacMullen et al. | 260/29.2 |
| 2,898,221 | 8/1959 | Carlson | 106/90 |
| 3,043,790 | 7/1962 | Sanders | 260/29.7 S |
| 3,190,762 | 6/1965 | Carlson et al. | 106/90 |
| 3,240,736 | 3/1966 | Beckwith | 260/29.2 |
| 3,354,169 | 11/1967 | Shafer et al. | 260/29.7 |

Primary Examiner—M. J. Welsh
Attorney, Agent, or Firm—R. G. Brookens; S. S. Grace

[57] ABSTRACT

Cement compositions having improved strength and enhanced adhesion to siliceous substrates are obtained by admixing Portland cement with a cement additive comprising (1) a styrene-butadiene interpolymeric latex containing up to about 60 parts by weight of interpolymer solids, said latex being present in an amount sufficient to provide from about 5 to about 25 parts by weight of latex polymer solids based on the weight of cement and (2) from about 0.05 to about 3 parts by weight of latex solids of a silane of the formula ZSi(OR')$_3$ wherein Z is a member selected from the group consisting of hydrocarbon groups and substituted hydrocarbon groups in which the substituent is bonded to the silicon atom through at least one carbon atom, and R' is selected from the group consisting of alkyl radicals of from 1 to 3 carbon atoms, —CH$_2$CH$_2$OR" and —CH$_2$CHOH where R" is an aliphatic hydrocarbon radical of 1 to 3 inclusive carbon atoms.

16 Claims, No Drawings

STYRENE-BUTADIENE INTERPOLYMER LATEX BASED CEMENT ADDITIVES CONTAINING A SILANE

BACKGROUND OF THE INVENTION

Portland cement is one of the most widely used materials in the construction industry. Although unmodified concrete and cement mortar systems (i.e., those not containing a polymer latex modifier) have adequate properties for many construction applications, there remain many areas in which such properties, particularly strength properties, are not acceptable.

Latex-modified Portland cement systems have been developed that significantly change the physical properties of unmodified concrete and cement mortar. Of such latex-modified cement systems, the addition of styrene-butadiene polymer latexes to Portland cement have provided compositions having improved strength, flexibility, adhesion, elongation at break, as well as smaller volume change. U.S. Pat. No. 3,043,790 (Re 28,722) and U.S. Pat. No. 3,895,953 are directed to such latex-modified Portland cement systems.

The present invention is directed to a cement additive based on a styrene-butadiene interpolymer latex containing a silane coupling agent and to cement compositions containing the same, which compositions have significantly improved strength and adhesion to other siliceous materials, as compared to prior known styrene-butadiene latex modified Portland cement compositions.

SUMMARY OF THE INVENTION

This invention is directed to a cement additive comprising (1) a styrene-butadiene interpolymer latex containing up to about 60 parts by weight of interpolymer solids, (2) from about 0.05 to about 3 parts by weight of latex solids of a silane of the formula $ZSi(OR')_3$ wherein Z is a member selected from the group consisting of hydrocarbon groups and substituted hydrocarbon groups in which the substituent is bonded to the silicon atom through at least one carbon atom, and R' is selected from the group consisting of alkyl radicals of from 1 to 3 carbon atoms, $-CH_2CH_2OR''$ and $-CH_2CHOH$ where R'' is an aliphatic hydrocarbon radical of 1 to 3 inclusive carbon atoms; and to Portland cement compositions containing such additives.

The invention is further directed to cement additives as described above, additionally containing, based on 100 parts by weight of interpolymer solids, (A) from about 3 to about 10 parts by weight of a nonionic surfactant, (B) from about 3 to about 10 parts by weight of an anionic surfactant, and (C) from about 0.1 to about 5 parts by weight of a polyorganosiloxane foam depressant.

DESCRIPTION OF THE PREFERRED EMBODIMENTS

The term "Portland cement" is used herein to include generally the kind of product obtained by heating lime-clay mixtures, or natural cement-rock, to such a temperature that practically the entire product is sintered, followed by grinding. The product is often a mixture of dicalcium and tricalcium silicate with lesser amounts of aluminate. Various additives can be included in accordance with conventional Portland cement manufacturing practices. It will be understood that various modifications such as the hydraulic cements of the kind commonly known as calcium-aluminate cements can be used as substantial equivalents for the purposes of this invention.

In many instances, it may be desirable to combine the cement compositions of this invention with an aggregate material. In this regard, the preferred aggregate material is sand, however, any particulate material may be used including stone, gravel, pebbles, granite, carborundum, marble chips, mica and the like.

By the term "styrene-butadiene interpolymer latex" as used herein is meant any aqueous colloidal dispersion of a polymer of styrene and butadiene having a styrene:butadiene weight ratio of from about 30:70 to about 70:30, as well as those interpolymers having in addition thereto up to about 10 parts by weight of one or more additional monomers, such as acrylonitrile. A particularly preferred interpolymer consists essentially of about 66 weight percent styrene and about 34 weight percent butadiene. Such interpolymers can be prepared by mixing the monomeric ingredients, in the proportions corresponding to the composition of the desired interpolymer, in water containing an emulsifying agent or agents. The admixture is heated with agitation in the presence of a peroxide catalyst to initiate copolymerization as known in the art.

As disclosed supra, the silane compounds found to be useful for the purposes of the present invention are those materials having the formula $ZSi(OR')_3$, as generally disclosed in U.S. Pat. No. 3,190,762. Particularly preferred silanes include mercaptopropyltrimethoxysilane, glycidoxytrimethoxysilane, vinyltriacetoxysilane and N-betaaminoethyl-gamma-aminopropyltrimethoxysilane. Such materials may beneficially be used in concentrations of from about 0.05 to about 3 parts of silane per 100 parts of latex solids, with concentrations of about 1 part per 100 parts of latex solids being preferred. It is believed that the herein described beneficial results are obtained by reaction of the silane with the styrene-butadiene interpolymer latex, through a mercaptan group, followed by a subsequent reaction of the silane with a siliceous material such as sand or cement, e.g. through SiOH groups formed by the hydrolysis of a methoxy group in the silane.

Illustrative of nonionic surfactants are: fatty acid esters such as glycerol monostearate, diethylene glycol laurate, propylene glycol monostearate, sorbitol monolaurate and pentaerythritol monostearate; acid derivatives of ethylene oxide products such as the reaction product of six mols of ethylene oxide with one of oleic acid; condensation products of ethylene oxide with alcohols such as stearyl alcohol; and condensation products of ethylene oxide with phenols, naphthols and alkyl phenols. Preferred are the polyoxyalkylene derivatives of propylene glycol having a molecular weight of at least about 1,000 to about 15,000; and the condensation products of ethylene oxide with alkyl phenols, particularly the di-butyl-phenoxynonaoxyethylene-ethanols. The above monomeric surfactants are advantageously used in concentrations of from about 3 to about 10 and preferably about 5 parts by weight based on 100 parts of latex polymer solids. Utilization of concentrations less than about 3 parts by weight result in latex-modified cement compositions having inadequate adhesion to cementitious material to which they are conventionally applied, whereas utilization of such surfactants in concentrations exceeding about 10 parts by weight are unnecessary and may adversely affect the flow properties of the latex-modified cement compositions.

Particularly preferred anionic surfactants include the alkyl aryl sulfonates such as the sodium salt of dodecylated sulfonated phenyl ether, and the sulfate derivatives of higher fatty alcohols, particularly sodium lauryl sulfate. Such anionic surfactants are utilized in amounts of from about 3 to about 10 parts by weight, based on 100 parts of latex interpolymer solids, and preferably about 5 parts per 100 parts of latex interpolymer solids.

Illustrative of the polyorganosiloxanes are the condensation products resulting from polymerization or organo silane diols, as represented by the formula

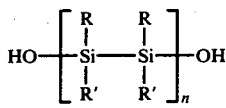

where R and R', in the above formula, represent organic radicals such as alkyl, aryl, aralkyl and alkaryl or heterocyclic groups, and n is one or more. Also useful are polymerization products of organo silane diols, in the presence of an organo silane monol, and condensation products obtained from mixtures of organo silane triols, diols and monols.

Preferably the organo substituent of the siloxanes is lower alkyl (i.e., methyl, ethyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids," "silicone emulsions" and "silicone compounds," the latter being siloxanes modified by the addition of a small percentage of finely divided silica or other inert divided solid. Any of these forms can be used in the practice of this invention.

Cement mixes are made according to the present invention by simply adding the cement additive prescribed herein to the cement with mixing and such added water as is necessary to obtain a cement mix of desired flow and working consistency. If the cement additive of the invention and Portland cement are to be employed in the manufacture of mortar or concrete by admixture with a mineral aggregate, such as sand or a mixture of sand with gravel, crushed stone or equivalent coarse aggregate, the cement will ordinarily constitute, in accordance with conventional practices, more than about 10 percent by weight of the mineral aggregate and usually from about 15 to 35 percent the weight of the mineral aggregate.

The concentration of the herein prescribed styrene-butadiene interpolymer cement additive solids in the cement composition necessary for the obtainment of optimum strength properties range from about 5 to about 25 parts by weight of interpolymer solids per 100 parts of cement. In this regard, concentrations less than about 5 percent, based on the weight of cement used, do not provide adequate mechanical properties such as flexibility, abrasion resistance and adherence. Further, total latex solids concentrations in excess of about 25 percent based on the weight of cement may significantly reduce the mechanical properties of the composition. Generally, a total latex solid concentration of about 15 percent based on the weight of cement, is preferred.

The following example, wherein all parts and percentages are by weight, serves to illustrate the present invention.

EXAMPLE 1

Part A—Preparation of Cement Additives

In each of a series of experiments, varying amounts of a silane compound was added with stirring to a styrene-butadiene latex having a pH of about 10 and composed essentially of about 48 weight percent of a solid copolymer of about 66 percent by weight styrene and about 34 percent by weight butadiene-1,3 with the copolymer particles having an average size of from about 1900 to about 2500 Angstroms; and based on the copolymer weight, about 4.65 percent of nonionic surfactant di-t-butyl-phenoxynonaoxyethylene-ethanol; and about 0.78 percent of a mixture of anionic surfactants comprising predominant amounts of sodium lauryl sulfate and correspondingly lesser amounts of dodecyl benzene sodium sulfonate, and a polymethylsiloxane foam depressant in an amount to provide about 0.4 percent by weight of polymethylsiloxane based on the weight of latex solids.

In each instance, the admixture of silane and latex was heated to a temperature of about 80° C. over a 1½ hour period.

Part B—Evaluation of Cement Additives in Cement Mortar

Cement mortar was prepared for strength testing by mixing the following ingredients in a Hobart mixer:

|  | Grams |
|---|---|
| Standard Ottawa Crystal Silica Sand | 975 |
| Peerless Brand Portland Cement — Type I | 300 |
| Piqua Marble Flour | 150 |
| Cement Additive (48% solids) | 100 |
| H₂O | 92 |

The mortar was molded into 2 inch cubes for compressive strength testing and in tensile briquettes with a 1 inch square cross section in accordance with ASTM methods. The specimens were cured in air at 75° F. and 50 percent relative humidity for 28 days. Half the specimens were tested for compressive and tensile strength. The other half was immersed in water for 7 additional days and then tested wet. The data were compared to unmodified mortar. The following Tables I and II set forth cement additive compositions and cement mortar properties.

TABLE I

| Exp. No. | Cement Additive | Compressive (psi) (ASTM C-109) Dry | Compressive (psi) (ASTM C-109) Wet | Tensile (psi) (ASTM C-190) Dry | Tensile (psi) (ASTM C-190) Wet | Vicat (mm)** (ASTM C-42) | Water/Cement Ratio (W/C) | Density (Lbs/Ft³) |
|---|---|---|---|---|---|---|---|---|
| For Comparison | | | | | | | | |
| 1 | None | 4308 | 4308 | 333 | 403 | 36 | 0.53 | 131.3 |
| 2 | (A) | 3308 | 3841 | 260 | 342 | 41 | 0.53 | 129.2 |
| 3 | (B) | 6223 | 5042 | 847 | 545 | 33 | 0.35 | 132.2 |
| The Invention | | | | | | | | |

TABLE I-continued

| Exp. No. | Cement Additive | Compressive (psi) (ASTM C-109) | Tensile (psi) (ASTM C-190) | | Vicat (mm)** (ASTM C-42) | Water/Cement Ratio (W/C) | Density (Lbs/Ft³) |
|---|---|---|---|---|---|---|---|
| 4 | (C) | 6575 | 5508 | 987 683 | 32 | 0.35 | 130.6 |
| 5 | (D) | 6642 | 5492 | 1020 743 | 36 | 0.35 | 131.7 |

Notes:
(A) 0.15%, based on cement weight, of mercaptopropyltrimethoxysilane — without latex.
(B) Latex without silane compound.
(C) Latex plus 1%, based on latex solids, of mercaptopropyltrimethoxysilane.
(D) As per (3) above where latex/silane mixture was heated in the pressure of 1% by weight of a peroxide catalyst.
**A measure of plasticity of freshly prepared mortar (penetration in mm of a 3.5 inch, 400 gram cone).

The data set forth above illustrate that addition of the silane compound to the prescribed cement mortar, in the absence of the prescribed styrene-butadiene latex, significantly reduces the compressive and tensile strengths of the cement mortar compositions (compare Experiment Nos. 1 and 2). The data further illustrate that addition of the silane compound to the latex unexpectedly enhances the strength properties of such cement mortar composition as compared to a cement mortar composition containing latex only as the cement modifier (compare Experiment Nos. 4 and 5 with Experiment No. 3).

The data set forth in the following Table II illustrate cross-brick adhesion values obtained for the specified cement mortar compositions. The cross-brick adhesion value is that value required to pull apart two bricks bonded by mortar at an angle of 90° C. to each other.

TABLE II

| Exp. No. | Cement Additive | Silane Conc. (% by wt. of latex solids) | Cross-Brick Adhesion (psi) | | Vicat (mm) (ASTM C-42) |
|---|---|---|---|---|---|
| | | | 6 days dry cure | 6 days dry cure + 6 days H₂O Immersion | |
| For Comparison | | | | | |
| 6 | None | 0 | <100 | <100 | 65-70 |
| 7 | (A) | 1 | <100 | <100 | 65-70 |
| 8 | (B) | 0 | 186 | 171 | 70 |
| The Invention | | | | | |
| 9 | (C) | 0.6 | 261 | 277 | 72 |
| 10 | (D) | 1 | 321 | 217 | 74 |
| 11 | (E) | 1 | >344 | 202 | 75 |
| 12 | (F) | 1 | >344 | 180 | 64 |
| 13 | (G) | 1 | >344 | 291 | 71 |

Notes:
(A) Mercaptopropyltrimethoxysilane — no latex.
(B) Latex without silane.
(C) Latex plus mercaptopropyltrimethoxysilane.
(D) Latex plus mercaptopropyltrimethoxysilane.
(E) Latex plus glycidoxypropyltrimethoxysilane.
(F) Latex plus vinyltriacetoxysilane.
(G) Latex plus N-betaaminoethyl-gamma-aminopropyltrimethoxysilane.

The above data illustrate the highly beneficial adhesion values obtainable with the cement additives prescribed by the present invention. This result has been heretofore unobtainable utilizing a cement additive based on a styrene-butadiene interpolymer latex.

What is claimed is:

1. A cement additive comprising (1) a styrene-butadiene interpolymeric latex containing up to about 60 parts by weight of interpolymer solids, (2) as a coupling agent from about 0.05 to about 3 parts by weight of latex solids of a silane of the formula ZSi(OR')₃ wherein Z is a member selected from the group consisting of hydrocarbon groups and substituted hydrocarbon groups in which the substituent is bonded to the silicon atom through at least one carbon atom, and R' is selected from the group consisting of alkyl radicals of from 1 to 3 carbon atoms, —CH₂CH₂OR" and —CH₂CHOH where R" is an aliphatic hydrocarbon radical of 1 to 3 inclusive carbon atoms.

2. The cement additive of claim 1 wherein said styrene-butadiene interpolymer has a styrene:butadiene weight ratio of from about 30:70 to about 70:30.

3. The cement additive of claim 2 wherein said additive additionally contains, based on 100 parts by weight of interpolymer solids, (A) from about 3 to about 10 parts by weight of a nonionic surfactant, (B) from about 3 to about 10 parts by weight of an anionic surfactant, and (C) from about 0.1 to about 5 parts by weight of a polyorganosiloxane foam depressant.

4. The cement additive of claim 3 wherein said nonionic surfactant is a di-t-butyl-phenoxynonaoxyethylene-ethanol.

5. The cement additive of claim 4 wherein said anionic surfactant is sodium lauryl sulfate.

6. The cement additive of claim 5 wherein said polyorganosiloxane foam depressant is a condensation product of dimethyl silane diol.

7. The cement additive of claim 6 wherein said silane is selected from the group consisting of mercaptopropyltrimethoxysilane, glycidoxytrimethoxysilane, vinyltriacetoxysilane, and N-betaaminoethyl-gamma-aminopropyltrimethoxysilane.

8. The cement additive of claim 7 wherein said interpolymer is an interpolymer of about 66 parts by weight styrene and about 34 parts by weight butadiene.

9. A Portland cement composition comprising a mixture of Portland cement and a cement additive comprising (1) a styrene-butadiene interpolymeric latex containing up to about 60 parts by weight of interpolymer solids, and latex being present in an amount sufficient to provide from about 5 to about 25 parts by weight of latex polymer solids based on the weight of cement and (2) as a coupling agent from about 0.05 to about 3 parts by weight of latex solids of a silane of the formula ZSi(OR')₃ wherein Z is a member selected from the group consisting of hydrocarbon groups and substituted hydrocarbon groups in which the substituent is bonded to the silicon atom through at least one carbon atom, and R' is selected from the group consisting of alkyl radicals of from 1 to 3 inclusive carbon atoms, —CH₂CH₂OR" and —CH₂CHOH where R" is an aliphatic hydrocarbon radical of 1 to 3 inclusive carbon atoms.

10. The Portland cement composition of claim 9 wherein said styrene-butadiene interpolymer has a styrene:butadiene weight ratio of from about 30:70 to about 70:30.

11. The Portland cement composition of claim 10 wherein said additive additionally contains, based on 100 parts by weight of interpolymer solids, (A) from about 3 to about 10 parts by weight of a nonionic surfactant, (B) from about 3 to about 10 parts by weight of an anionic surfactant, and (C) from about 0.1 to about 5 parts by weight of a polyorganosiloxane foam depressant.

12. The Portland cement composition of claim 11 wherein said nonionic surfactant is a di-butyl-phenoxynonaoxyethylene-ethanol.

13. The Portland cement composition of claim 12 wherein said anionic surfactant is sodium lauryl sulfate.

14. The Portland cement composition of claim 13 wherein said polyorganosiloxane foam depressant is a condensation product of dimethyl silane diol.

15. The Portland cement composition of claim 14 wherein said silane is selected from the group consisting of mercaptopropyltrimethoxysilane, glycidoxytrimethoxysilane, vinyltriacetoxysilane, and N-betaaminoethyl-gamma-aminopropyltrimethoxysilane.

16. The Portland cement composition of claim 15 wherein said interpolymer is an interpolymer of about 66 parts by weight styrene and about 34 parts by weight butadiene.

* * * * *